(12) United States Patent
Ohashi

(10) Patent No.: US 10,998,782 B2
(45) Date of Patent: May 4, 2021

(54) MOTOR AND ELECTRIC POWER STEERING APPARATUS

(71) Applicant: Nidec Corporation, Kyoto (JP)

(72) Inventor: Hiromitsu Ohashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 304 days.

(21) Appl. No.: 16/086,031

(22) PCT Filed: Apr. 19, 2017

(86) PCT No.: PCT/JP2017/015721
§ 371 (c)(1),
(2) Date: Sep. 18, 2018

(87) PCT Pub. No.: WO2017/183656
PCT Pub. Date: Oct. 26, 2017

(65) Prior Publication Data
US 2020/0303976 A1 Sep. 24, 2020

Related U.S. Application Data

(60) Provisional application No. 62/408,217, filed on Oct. 14, 2016, provisional application No. 62/324,536, filed on Apr. 19, 2016.

(51) Int. Cl.
*H02K 29/03* (2006.01)
*H02K 1/27* (2006.01)
(Continued)

(52) U.S. Cl.
CPC ............ *H02K 1/2706* (2013.01); *H02P 6/10* (2013.01); *H02P 27/06* (2013.01)

(58) Field of Classification Search
CPC ........ H02K 29/03; H02K 1/06; H02K 1/2766; H02K 2201/06
See application file for complete search history.

(56) References Cited

U.S. PATENT DOCUMENTS 6,081,058 A * 6/2000 Suzuki ................. H02K 1/2786
310/156.45
6,133,662 A * 10/2000 Matsunobu ............ H02K 1/278
310/156.53
(Continued)

FOREIGN PATENT DOCUMENTS

EP 2 525 479 A1 11/2012
JP 1-234038 A 9/1989
(Continued)

OTHER PUBLICATIONS

Official Communication issued in International Patent Application No. PCT/JP2017/015721, dated Jul. 11, 2017.

*Primary Examiner* — Dang D Le
(74) *Attorney, Agent, or Firm* — Keating & Bennett

(57) ABSTRACT

A motor includes a rotor including a rotor core and permanent magnets along an outer periphery of the rotor core, and a stator including windings. Each of the permanent magnets includes a first face in contact with the outer periphery of the rotor core and a second face located outside the first face in a radial direction of the rotor and which faces the stator. In a plan view when the rotor is viewed from a direction parallel to the rotation axis direction of the rotor, the first face includes a linear portion, the second face includes a linear portion parallel to the linear portion of the first face, and a length of the linear portion of the second face is 20% or more and less than 85% of a length of the linear portion of the first face.

8 Claims, 7 Drawing Sheets

(51) Int. Cl.
*H02P 6/10* (2006.01)
*H02P 27/06* (2006.01)

(56) References Cited

U.S. PATENT DOCUMENTS

| | | | |
|---|---|---|---|
| 6,987,341 B2 * | 1/2006 | Chang | H02K 1/276 |
| | | | 310/156.45 |
| 7,126,306 B2 | 10/2006 | Sakamoto et al. | |
| 7,151,354 B2 | 12/2006 | Yoshinaga et al. | |
| 7,531,933 B2 * | 5/2009 | Miyata | H02K 1/278 |
| | | | 310/156.38 |
| 8,217,546 B2 | 7/2012 | Thomas | |
| 8,446,054 B2 * | 5/2013 | Toyota | H02K 41/031 |
| | | | 310/12.24 |
| 9,276,507 B2 | 3/2016 | Bruyere et al. | |
| 9,331,623 B2 | 5/2016 | Hirotani et al. | |
| 9,571,017 B2 | 2/2017 | Hirotani et al. | |
| 2008/0067960 A1 | 3/2008 | Maeda et al. | |
| 2008/0284269 A1 * | 11/2008 | Tajima | H02K 1/276 |
| | | | 310/156.46 |
| 2009/0026895 A1 * | 1/2009 | Chakrabarti | H02K 11/33 |
| | | | 310/68 D |
| 2011/0248508 A1 * | 10/2011 | Thomas | H02K 1/278 |
| | | | 290/55 |

FOREIGN PATENT DOCUMENTS

| | | | |
|---|---|---|---|
| JP | 4-79788 A | 3/1992 |
| JP | 2006-136144 A | 5/2006 |
| JP | 2006-287990 A | 10/2006 |
| JP | 4155152 B2 | 9/2008 |
| JP | 2011-36105 A | 2/2011 |
| JP | 4791325 B2 | 10/2011 |
| JP | 2016-25810 A | 2/2016 |

\* cited by examiner

MOTOR AND ELECTRIC POWER STEERING APPARATUS

BACKGROUND OF THE INVENTION

1. Field of the Invention

The present disclosure relates to a motor and an electric power steering apparatus.

2. Description of the Related Art

In recent years, demands for quietness and low vibration are increasing for electric motors such as brushless DC motors and AC synchronous motors (hereinafter simply referred to as "motor"). In particular, a motor for an electric power steering apparatus is required to have a high silent property and a low vibration property in order to improve the steering feeling.

Further improvement in lower vibration of the motor is required.

SUMMARY OF THE INVENTION

Exemplary embodiments of the present disclosure provide motors capable of reducing vibration.

A motor according to an exemplary embodiment of the present disclosure includes a rotor including a rotor core and a plurality of permanent magnets provided along an outer periphery of the rotor core, and a stator including a plurality of windings. Each of the plurality of permanent magnets includes a first face in contact with an outer peripheral portion of the rotor core, and a second face located outside the first face in the radial direction of the rotor and facing the stator. In a plan view when the rotor is viewed from a direction parallel to a rotation axis direction of the rotor, the first face includes a linear portion, the second face includes a linear portion parallel to the linear portion of the first face, and the length of the linear portion of the second face is 20% or more and less than 85% of the length of the linear portion of the first face.

According to the exemplary embodiments of the present disclosure, vibrations of motors are reduced.

The above and other elements, features, steps, characteristics and advantages of the present disclosure will become more apparent from the following detailed description of the exemplary embodiments with reference to the attached drawings.

DETAILED DESCRIPTION OF EXEMPLARY EMBODIMENTS

Before describing the exemplary embodiments of the present disclosure, the knowledge of the present inventors, which forms the basis of the present disclosure, will be explained.

As described above, when a harmonic component is superimposed on a current supplied to a motor, depending on the structure of a rotor and a stator, the magnetic flux generated from winding may be disturbed, whereby the high-order current may become noise and the torque ripple etc. may deteriorate.

In order to reduce the torque ripple and the cogging torque, for example, for a surface permanent magnet motor, the outer surface (radially outer surface) of the permanent magnet is curved so as to have a substantially arc shape in a plan view. Generally, a permanent magnet for a rotor is formed by cutting a block-shaped magnet material. At the time of molding an arc-shaped magnet, there is a problem that the amount to be scraped out from the material increases and the processing cost of the magnet increases. Further, when the scraped amount increases, the volume of the magnet is reduced. As a result, there is a problem that the amount of magnetic flux generated from the magnet decreases and the torque generated at the time of driving the motor also decreases.

In order to reduce vibration and torque ripple, it is conceivable to make the magnetic flux of the permanent magnet contain harmonic components by complicating the shape of the permanent magnet for the rotor. However, as the shape of the permanent magnet becomes complicated, the processing becomes difficult, and the cost associated with the processing increases.

Even in the case where the cost is low and the high-order current is superimposed on the drive current, a magnet shape which hardly generates vibrations and torque ripples is required.

Hereinafter, exemplary embodiments of a motor and an electric power steering apparatus of the present disclosure will be described in detail with reference to the accompanying drawings. However, detailed explanation more than necessary may be omitted. For example, detailed explanation of already well-known matters and redundant explanation on substantially the same configuration may be omitted. This is to avoid the unnecessary redundancy of the following description and to facilitate understanding by those skilled in the art.

In exemplary embodiments of the present disclosure of the present specification, a three-phase motor having windings of three phases (U-phase, V-phase, W-phase) will be described as an example. However, an n-phase motor having n-phase (n is an integer of 3 or more) windings such as four phases and five phases, for example, is also within the scope of the present disclosure.

Figure 1:
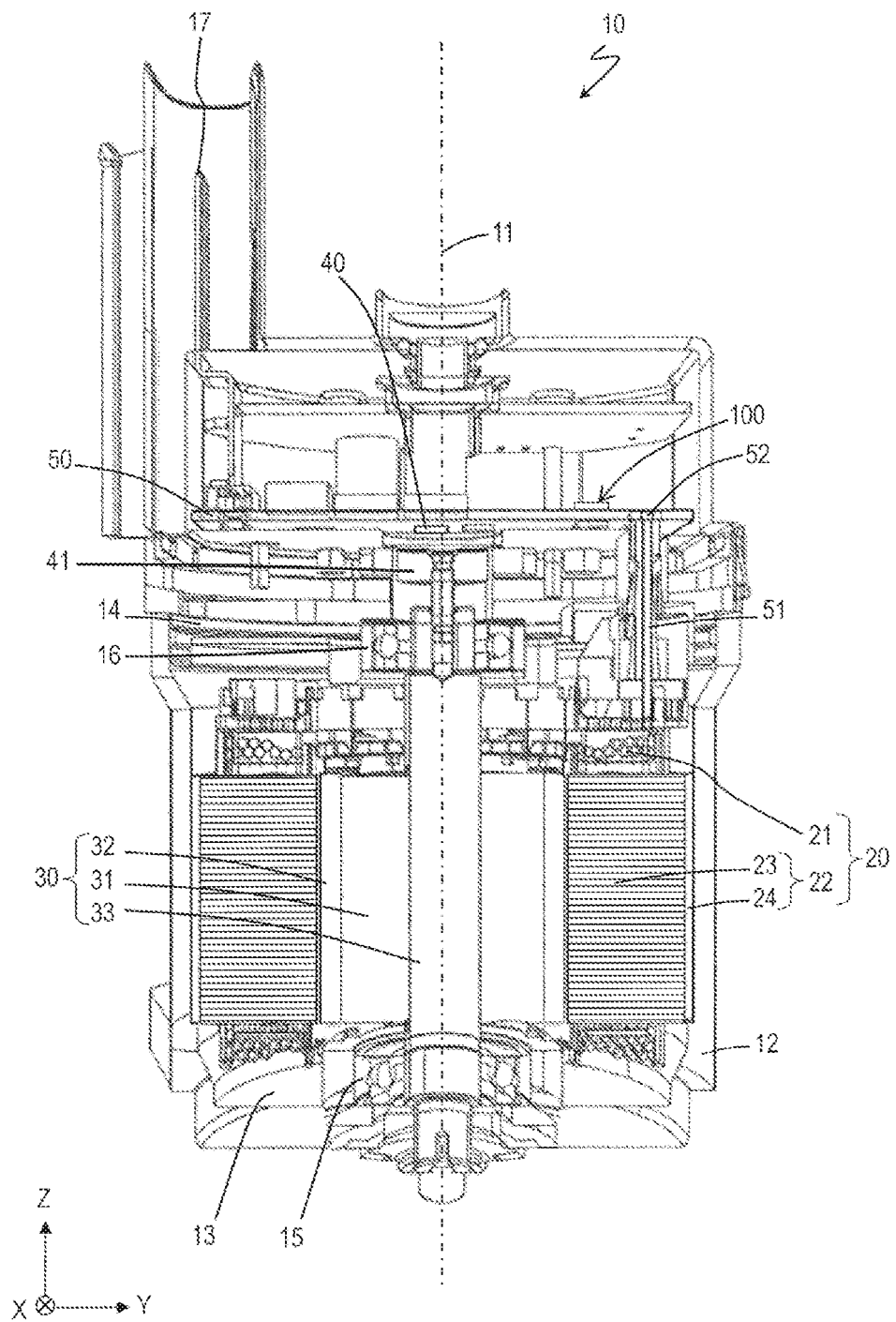
FIG. 1 is a schematic diagram illustrating a structure of a motor according to an exemplary embodiment of the present invention.

FIG. 1 is a view illustrating a structure of a motor 10 according to the present exemplary embodiment. FIG. 1 shows the interior of the motor 10 when it is cut along the central axis 11.

The motor 10 is a mechanically and electrically integrated motor. The motor 10 is mounted on, for example, an automobile and is used as a motor for an electric power steering apparatus. In this case, the motor 10 generates the driving force of the electric power steering apparatus.

The motor 10 includes a stator 20, a rotor 30, a housing 12, a partition wall 14, a bearing 15, and a bearing 16. The stator 20 is also called an armature. The central axis 11 is a rotation axis of the rotor 30.

The housing 12 is a substantially cylindrical housing having a bottom, and accommodates the stator 20, the bearing 15, and the rotor 30 therein. A recess 13 for holding the bearing 15 is at the center of the bottom of the housing 12. The partition wall 14 is a plate-shaped member that closes the upper opening of the housing 12. The partition wall 14 holds the bearing 16 at its central portion.

The stator 20 is annular and has a laminated body 22 and a winding 21. The laminated body 22 is also called a laminated annular core. The winding is also called a coil. The stator 20 generates a magnetic flux according to the drive current. The laminated body 22 is constituted by a laminated steel plate in which a plurality of steel plates is laminated in the direction along the central axis 11 (Z direction in FIG. 1). The laminated body 22 includes an annular laminated core back 24 and a plurality of laminated teeth 23. The laminated core back 24 is fixed to the inner wall of the housing 12.

The winding 21 is made of a conductive material such as copper, and is typically attached to the plurality of laminated teeth 23 of the laminated body 22.

The rotor 30 includes a rotor core 31, a plurality of permanent magnets 32 provided along the outer periphery of the rotor core 31, and a shaft 33. The rotor core 31 is made of a magnetic material such as iron, and has a cylindrical shape. In the present exemplary embodiment, the rotor core 31 is composed of a laminated steel plate in which a plurality of steel plates is laminated in the direction along the central axis 11 (Z direction in FIG. 1). The plurality of permanent magnets 32 are provided so that the N pole and the S pole appear alternately in the circumferential direction of the rotor core 31. The shaft 33 is fixed to the center of the rotor core 31 and extends in the vertical direction (Z direction) along the central axis 11. Note that in this specification, the up, down, left, and right directions are the up, down, left, and right directions when viewing the motor 10 shown in FIG. 1. In order to explain the exemplary embodiments in an easy-to-understand manner, these directions are used for explanation. Needless to say, the up, down, left, and right directions in this specification do not necessarily match with the up, down, left, and right directions in a state where the motor 10 is mounted on an actual product (such as an automobile).

The bearings 15 and 16 rotatably support the shaft 33 of the rotor 30. The bearings 15 and 16 are, for example, ball bearings which relatively rotate the outer ring and the inner ring via spherical bodies. FIG. 1 illustrates a ball bearing.

In the motor 10, when the drive current is supplied to the winding 21 of the stator 20, a magnetic flux in the radial direction is generated in the plurality of laminated teeth 23 of the laminated body 22. Torque is generated in the circumferential direction by the action of the magnetic flux between the plurality of laminated teeth 23 and the plurality of permanent magnets 32, and the rotor 30 rotates with respect to the stator 20. When the rotor 30 rotates, a driving force is generated, for example, in the electric power steering apparatus.

A permanent magnet 41 is fixed to the end of the shaft 33 on the partition wall 14 side. The permanent magnet 41 is rotatable together with the rotor 30. On the upper part of the partition wall 14, a substrate 50 is disposed. A power conversion apparatus 100 is mounted on the substrate 50. The partition wall 14 separates the space in which the stator 20 and the rotor 30 inside the motor 10 are accommodated from the space in which the substrate 50 is accommodated.

The power conversion apparatus 100 converts electric power from a power source into electric power to be supplied to the winding 21 of the stator 20. The substrate 50 is provided with a terminal 52 of an inverter included in the power conversion apparatus 100. An electric wire 51 is connected to the terminal 52. The electric wire 51 is, for example, an end of the winding 21. The electric wire 51 and the winding 21 may be separate members. The electric power output from the power conversion apparatus 100 is supplied to the winding 21 via the electric wire 51. Details of the power conversion apparatus 100 will be described later.

A magnetic sensor 40 is provided on the substrate 50. The magnetic sensor 40 is disposed at a position opposed to the permanent magnet 41 fixed to the shaft 33. The magnetic sensor 40 is disposed on the central axis 11 of the shaft 33. The magnetic sensor 40 is, for example, a magnetoresistance effect element or a Hall element. The magnetic sensor 40 detects a magnetic field generated from the permanent magnet 41 rotating together with the shaft 33, whereby it is possible to detect the rotation angle of the rotor 30.

The motor 10 is connected to various control apparatuses outside the motor 10 and a battery or the like via a plurality of terminals 17. The plurality of terminals 17 include a power supply terminal to which electric power is supplied from an external power supply and a signal terminal for transmitting and receiving data to and from an external device.

Next, the details of the power conversion apparatus 100 will be described.

Figure 2:
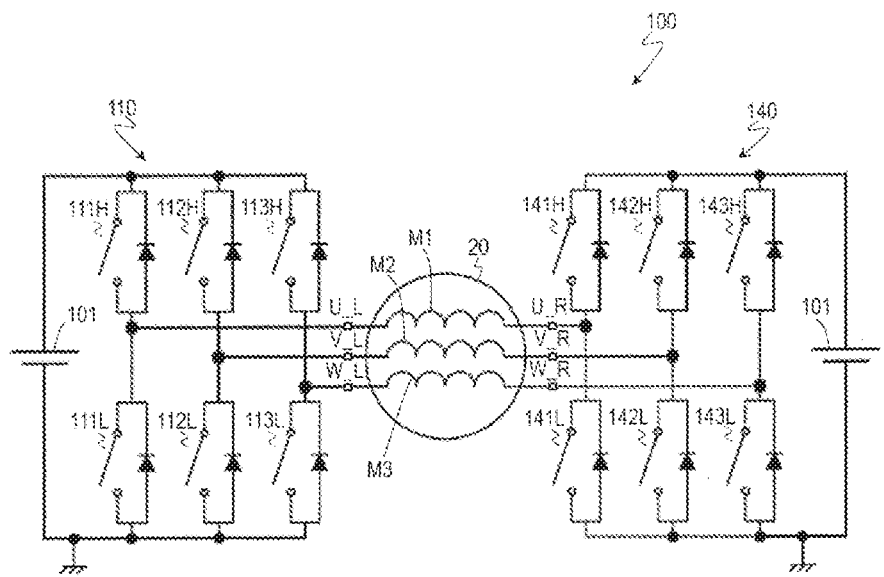
FIG. 2 is a schematic diagram illustrating a circuit configuration of a power conversion apparatus according to an exemplary embodiment of the present invention.

FIG. 2 is a schematic diagram illustrating a circuit configuration of the power conversion apparatus 100 according to the present exemplary embodiment.

The power conversion apparatus 100 includes a first inverter 110 and a second inverter 140. Further, the power conversion apparatus 100 includes a control circuit 300 shown in FIG. 3.

As the windings 21 (FIG. 1), a U-phase winding M1, a V-phase winding M2 and a W-phase winding M3 are wound around the stator 20. The winding of each phase is connected to the first inverter 110 and the second inverter 140. Specifically, the first inverter 110 is connected to one end of each phase winding, and the second inverter 140 is connected to the other end of each phase winding. In the present specification, "connection" between components in the electric circuit means mainly electrical connection.

The first inverter 110 has terminals U_L, V_L, and W_L corresponding to each phase as the terminal 52 (FIG. 1). The second inverter 140 has terminals U_R, V_R and W_R corresponding to each phase as the terminal 52. The terminal U_L of the first inverter 110 is connected to one end of the U-phase winding M1, the terminal V_L is connected to one end of the V-phase winding M2, and the terminal W_L is connected to one end of the W-phase winding M3. Similarly to the first inverter 110, the terminal U_R of the second inverter 140 is connected to the other end of the U-phase winding M1, the terminal V_R is connected to the other end of the V-phase winding M2, and the terminal W_R is connected to the other end of the W-phase winding M3. Such connection is different from the so-called star connection and delta connection.

In the power conversion apparatus 100, the first inverter 110 and the second inverter 140 are connected to a power supply 101 and the GND. The motor 10 having the power conversion apparatus 100 can be connected to an external power supply via, for example, the terminal 17 (FIG. 1).

In the present specification, the first inverter 110 may be referred to as a "bridge circuit L" in some cases. Also, the second inverter 140 may be referred to as a "bridge circuit R" in some cases. Each of the first inverter 110 and the second inverter 140 includes three legs including a low-side switching element and a high-side switching element. The plurality of switching elements constituting these legs constitutes a plurality of H bridges between the first inverter 110 and the second inverter 140 via windings.

The first inverter 110 includes a bridge circuit composed of three legs. Switching elements 111L, 112L and 113L shown in FIG. 2 are low-side switching elements, and switching elements 111H, 112H and 113H are high-side switching elements. As the switching element, for example, a field effect transistor (typically MOSFET) or an insulated gate bipolar transistor (IGBT) can be used. In the specification of the present application, an example of using an FET as a switching element of an inverter will be described, and in the following description, the switching element may be referred to as an FET. For example, the switching element 111L is denoted as an FET 111L.

Similarly to the first inverter 110, the second inverter 140 includes a bridge circuit composed of three legs. The FETs 141L, 142L and 143L shown in FIG. 2 are low-side switching elements, and the FETs 141H, 142H and 143H are high-side switching elements. Each FET of the first and second inverters 110, 140 may be controlled by, for example, a microcontroller or a dedicated driver.

The power supply 101 (FIG. 2) generates a predetermined power supply voltage. Power is supplied from the power supply 101 to the first and second inverters 110, 140. For example, a DC power supply is used as the power supply 101. However, the power supply 101 may be an AC-DC converter, a DC-DC converter, or a battery (storage battery). The power supply 101 may be a single power supply common to the first and second inverters 110, 140, or may be provided with a first power supply for the first inverter 110 and a second power supply for the second inverter 140.

Figure 3:
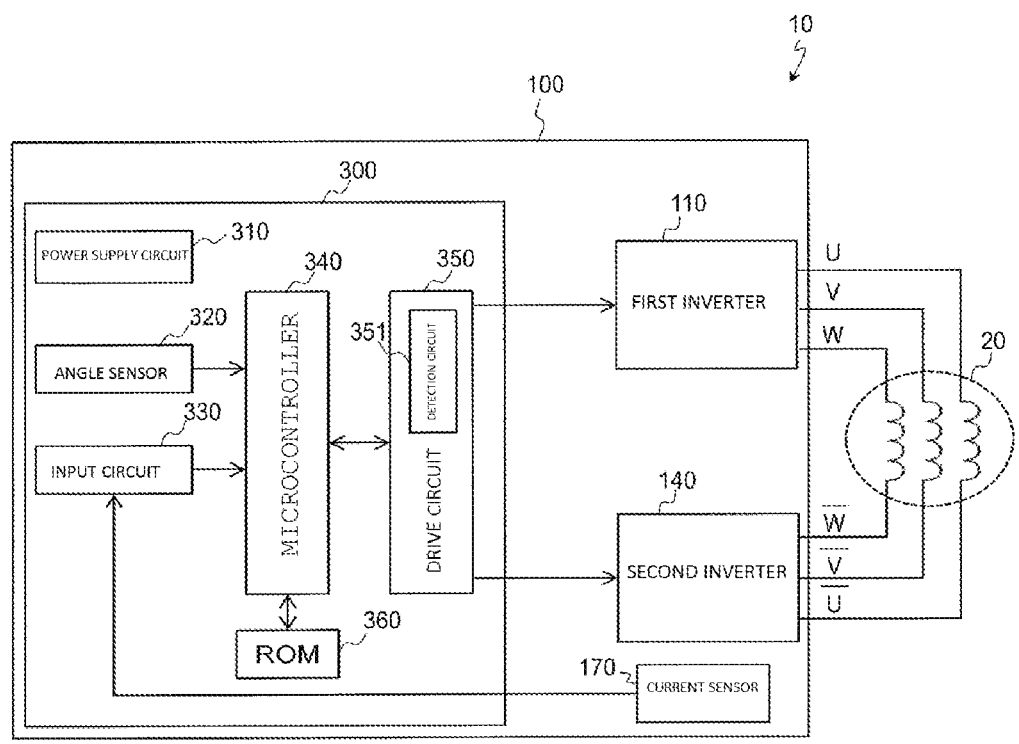
FIG. 3 is a block diagram illustrating a motor including a power conversion apparatus according to an exemplary embodiment of the present invention.

FIG. 3 is a schematic diagram illustrating a block configuration of the motor 10 including the power conversion apparatus 100. The power conversion apparatus 100 includes the control circuit 300.

The control circuit 300 includes, for example, a power supply circuit 310, an angle sensor 320, an input circuit 330, a microcontroller 340, a drive circuit 350, and a ROM 360. In this example, the angle sensor 320 is the magnetic sensor 40 (FIG. 1). The control circuit 300 controls the rotation of the motor 10 by controlling the overall operation of the power conversion apparatus 100. Specifically, the control circuit 300 can implement closed-loop control by controlling a rotor position, a rotation speed, a current, and the like which are targeted. The control circuit 300 may include a torque sensor. In this case, the control circuit 300 can control the target motor torque.

The power supply circuit 310 generates DC voltages (for example, 3V and 5V) necessary for each block in the circuit. The angle sensor 320 is, for example, a magnetoresistance effect element, a resolver, or a Hall IC. The angle sensor 320 detects a rotation angle of the rotor 30 (hereinafter referred to as a "rotation signal") and outputs the rotation signal to the microcontroller 340. A current sensor 170 has a shunt resistor connected between the low-side switching element of the inverter and the GND, for example. The current sensor 170 detects a current flowing through respective windings of the U-phase, the V-phase, and the W-phase. The input circuit 330 receives the motor current value (hereinafter referred to as an "actual current value") detected by the current sensor 170, converts the level of the actual current value to the input level of the microcontroller 340 as necessary, and outputs the actual current value to the microcontroller 340.

The microcontroller 340 controls the switching operation (turn-on or turn-off) of each FET of the first inverter 110 and the second inverter 140. The microcontroller 340 sets the target current value according to the actual current value and the rotation signal of the rotor, etc. to generate a PWM signal, and outputs it to the drive circuit 350.

The drive circuit 350 is typically a gate driver. The drive circuit 350 generates a control signal (gate control signal) for controlling the switching operation of each FET in the first and second inverters 110, 140 in accordance with the PWM signal and supplies a control signal to the gate of each FET. Note that the microcontroller 340 may have the function of the drive circuit 350. In this case, the control circuit 300 may not be provided with the drive circuit 350.

The ROM 360 is, for example, a writable memory, a rewritable memory or a read-only memory. The ROM 360 stores a control program including an instruction group for causing the microcontroller 340 to control the power conversion apparatus 100. For example, the control program is once developed in the RAM (not shown) at the time of booting.

The control circuit 300 drives the motor 10 by performing three-phase energization control using both the first and second inverters 110, 140. Specifically, the control circuit 300 performs three-phase energization control by switching-controlling the FET of the first inverter 110 and the FET of the second inverter 140 with opposite phases (phase difference=180°). For example, paying attention to the H bridge including the FETs 111L, 111H, 141L, and 141H, when the FET 111L is turned on, the FET 141L is turned off, and when the FET 111L is turned off, the FET 141L is turned on. Similarly, when the FET 111H is turned on, the FET 141H is turned off, and when the FET 111H is turned off, the FET 141H is turned on. The current output from the power supply 101 flows through the high-side switching element, the winding, and the low-side switching element to the GND.

The connection of the power conversion apparatus 100 may be referred to as an open connection.

Here, the path of the current flowing through the U-phase winding M1 will be described. When FET 111H and FET 141L are turned on and FET 141H and FET 111L are turned off, the current flows in the order of the power supply 101, the FET 111H, the winding M1, the FET 141L, and the GND. When the FET 141H and the FET 111L are turned on and the FET 111H and the FET 141L are turned off, the current flows in the order of the power supply 101, the FET 141H, the winding M1, the FET 111L, and the GND.

Note that part of the current flowing from the FET 111H to the winding M1 may flow to the FET 141H. That is, the current flowing from the FET 111H to the winding M1 may branch and flow to the FET 141L and the FET 141H in some cases. For example, when the motor 10 rotates at a low speed, the ratio of the current flowing into the FET 141H in the current flowing from the FET 111H to the winding M1 may increase as compared to the case of high-speed rotation.

Similarly, part of the current flowing from the FET 141H to the winding M1 may flow to the FET 111H. For example, when the motor 10 rotates at a low speed, the ratio of the current flowing into the FET 111H in the current flowing from the FET 141H to the winding M1 may increase as compared to the case of high-speed rotation.

Next, the path of the current flowing through the V-phase winding M2 will be described. When the FET 112H and the FET 142L are turned on and the FET 142H and the FET 112L are turned off, the current flows in the order of the power supply 101, the FET 112H, the winding M2, the FET 142L, and the GND. When the FET 142H and the FET 112L are turned on and the FET 112H and the FET 142L are turned off, the current flows in the order of the power supply 101, the FET 142H, the winding M2, the FET 112L, and the GND.

Note that part of the current flowing from the FET 112H to the winding M2 may flow to the FET 142H. For example, when the motor 10 rotates at a low speed, the ratio of the current flowing into the FET 142H in the current flowing from the FET 112H to the winding M2 may increase as compared to the case of high-speed rotation.

Similarly, part of the current flowing from the FET 142H to the winding M2 may flow to the FET 112H. For example, when the motor 10 rotates at a low speed, the ratio of the current flowing into the FET 112H in the current flowing from the FET 142H to the winding M2 may increase as compared to the case of high-speed rotation.

Next, the path of the current flowing through the W-phase winding M3 will be described. When FET 113H and FET 143L are turned on and FET 143H and FET 113L are turned off, the current flows in the order of the power supply 101, the FET 113H, the winding M3, the FET 143L, and the GND. When the FET 143H and the FET 113L are turned on and the FET 113H and the FET 143L are turned off, the current flows in the order of the power supply 101, the FET 143H, the winding M3, the FET 113L, and the GND.

Note that part of the current flowing from the FET 113H to the winding M3 may flow to the FET 143H in some cases. For example, when the motor 10 rotates at a low speed, the ratio of the current flowing into the FET 143H in the current flowing from the FET 113H to the winding M3 may increase as compared to the case of high-speed rotation.

Similarly, part of the current flowing from the FET 143H to the winding M3 may flow to the FET 113H in some cases. For example, when the motor 10 rotates at a low speed, the ratio of the current flowing into the FET 113H in the current flowing from the FET 143H to the winding M3 may increase as compared to the case of high-speed rotation.

Figure 4:
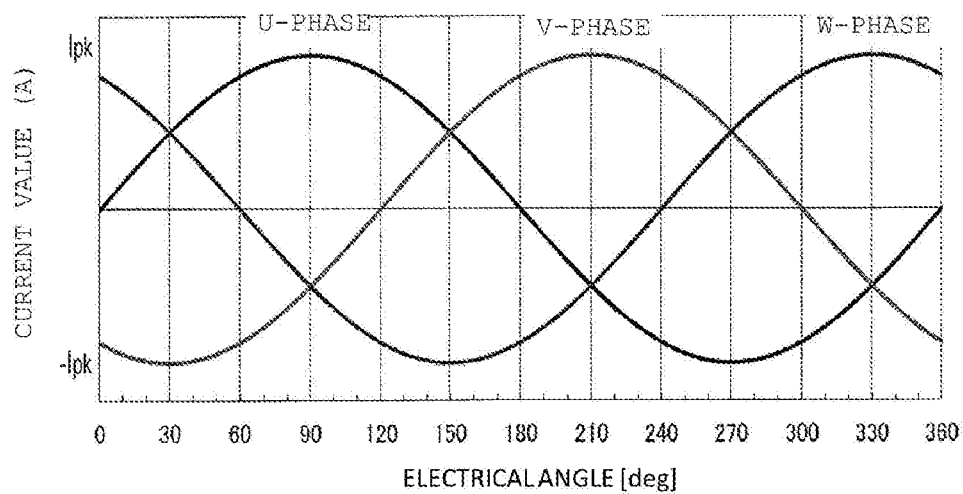
FIG. 4 is a diagram illustrating a current waveform obtained by plotting current values of current flowing through the U-phase, V-phase, and W-phase windings of the motor when the power conversion apparatus is controlled according to three-phase energization control according to an exemplary embodiment of the present invention.

FIG. 4 illustrates a current waveform (sine wave) obtained by plotting current values flowing through the respective windings of the U-phase, the V-phase, and the W-phase when the power conversion apparatus 100 is controlled according to the three-phase energization control. FIG. 4 shows the fundamental components of the currents flowing through the respective windings of the U-phase, V-phase and W-phase. The horizontal axis shows the motor electrical angle (deg), and the vertical axis shows the current value (A). In the current waveform of FIG. 4, the current value is plotted for every electrical angle of 30°. $I_{pk}$ represents the maximum current value (peak current value) of each phase. The control circuit 300 controls the switching operation of each FET of the bridge circuits L and R, for example, by a PWM control.

Table 1 shows the current values of current flowing to the terminals of each inverter at every electrical angle in the sinusoidal wave of FIG. 4. Specifically, Table 1 specifically shows the current values of current flowing through the terminals U_L, V_L and W_L of the first inverter 110 (bridge circuit L) at every electrical angle of 30°, and the current values of current flowing through the terminals U_R, V_R and W_R of the second inverter 140 (bridge circuit R) at every electrical angle of 30°. Here, for the bridge circuit L, the direction of current flowing from the terminals of the bridge circuit L to the terminals of the bridge circuit R is defined as a positive direction. The direction of the current shown in FIG. 4 follows this definition. For the bridge circuit R, the direction of current flowing from the terminals of the bridge circuit R to the terminals of the bridge circuit L is defined as a positive direction. Therefore, the phase difference between the current of the bridge circuit L and the current of the bridge circuit R is 180°. In Table 1, the magnitude of the current value $I_1$ is $[(3)^{1/2}/2]*I_{pk}$ and the magnitude of the current value $I_2$ is $I_{pk}/2$.

TABLE 1

| | | Electrical angle [deg] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| Bridge circuit L | U_L phase | 0 | $I_2$ | $I_1$ | Ipk | $I_1$ | $I_2$ | 0 | $-I_2$ | $-I_1$ | $-Ipk$ | $-I_1$ | $-I_2$ |
| | V_L phase | $-I_1$ | $-Ipk$ | $-I_1$ | $-I_2$ | 0 | $I_2$ | $I_1$ | Ipk | $I_1$ | $I_2$ | 0 | $-I_2$ |
| | W_L phase | $I_1$ | $I_2$ | 0 | $-I_2$ | $-I_1$ | $-Ipk$ | $-I_1$ | $-I_2$ | 0 | $I_2$ | $I_1$ | Ipk |
| Bridge circuit R | U_R phase | 0 | $-I_2$ | $-I_1$ | $-Ipk$ | $-I_1$ | $-I_2$ | 0 | $I_2$ | $I_1$ | Ipk | $I_1$ | $I_2$ |
| | V_R phase | $I_1$ | Ipk | $I_1$ | $I_2$ | 0 | $-I_2$ | $-I_1$ | $-Ipk$ | $-I_1$ | $-I_2$ | 0 | $I_2$ |
| | W_R phase | $-I_1$ | $-I_2$ | 0 | $I_2$ | $I_1$ | Ipk | $I_1$ | $I_2$ | 0 | $-I_2$ | $-I_1$ | $-Ipk$ |

At an electrical angle of 0°, no current flows through the U-phase winding M1. A current with a magnitude $I_1$ flows from the bridge circuit R to the bridge circuit L in the V-phase winding M2, and a current with a magnitude $I_1$ flows from the bridge circuit L to the bridge circuit R in the W-phase winding M3.

At an electrical angle of 30°, a current with a magnitude 12 flows from the bridge circuit L to the bridge circuit R in the U-phase winding M1, a current with a magnitude Ipk flows from the bridge circuit R to the bridge circuit L in the V-phase winding M2, and a current with a magnitude $I_2$ flows from the bridge circuit L to the bridge circuit R in the W-phase winding M3.

At an electrical angle of 60°, a current with a magnitude $I_1$ flows from the bridge circuit L to the bridge circuit R in the U-phase winding M1 and a current with a magnitude $I_1$ flows from the bridge circuit R to the bridge circuit L in the V-phase winding M2. No current flows through the W-phase winding M3.

At an electrical angle of 90°, a current with a magnitude Ipk flows from the bridge circuit L to the bridge circuit R in the U-phase winding M1, a current with a magnitude $I_2$ flows from the bridge circuit R to the bridge circuit L in the V-phase winding M2, and a current with a magnitude $I_2$ flows from the bridge circuit R to the bridge circuit L in the W-phase winding M3.

At an electrical angle of 120°, a current with a magnitude $I_1$ flows from the bridge circuit L to the bridge circuit R in the U-phase winding M1 and a current with a magnitude $I_1$ flows from the bridge circuit R to the bridge circuit L in the W-phase winding M3. No current flows through the V-phase winding M2.

At an electrical angle of 150°, a current with a magnitude $I_2$ flows from the bridge circuit L to the bridge circuit R in the U-phase winding M1, a current with a magnitude $I_2$ flows from the bridge circuit L to the bridge circuit R in the V-phase winding M2, and a current with a magnitude Ipk flows from the bridge circuit R to the bridge circuit L in the W-phase winding M3.

At an electrical angle of 180°, no current flows through the U-phase winding M1. A current with a magnitude $I_1$ flows from the bridge circuit L to the bridge circuit R in the V-phase winding M2 and a current with a magnitude $I_1$ flows from the bridge circuit R to the bridge circuit L in the W-phase winding M3.

At an electrical angle of 210°, a current with a magnitude $I_2$ flows from the bridge circuit R to the bridge circuit L in the U-phase winding M1, a current with a magnitude Ipk flows from the bridge circuit L to the bridge circuit R in the V-phase winding M2, and a current with a magnitude $I_2$ flows from the bridge circuit R to the bridge circuit L in the W-phase winding M3.

At an electrical angle of 240°, a current with a magnitude $I_1$ flows from the bridge circuit R to the bridge circuit L in the U-phase winding M1 and a current with a magnitude $I_1$ flows from the bridge circuit L to the bridge circuit R in the V-phase winding M2. No current flows through the W-phase winding M3.

At an electrical angle of 270°, a current with a magnitude Ipk flows from the bridge circuit R to the bridge circuit L in the U-phase winding M1, a current with a magnitude $I_2$ flows from the bridge circuit L to the bridge circuit R in the V-phase winding M2, and a current with a magnitude $I_2$ flows from the bridge circuit L to the bridge circuit R in the W-phase winding M3.

At an electrical angle of 300°, a current with a magnitude $I_1$ flows from the bridge circuit R to the bridge circuit L in the U-phase winding M1 and a current with a magnitude $I_1$ flows from the bridge circuit L to the bridge circuit R in the W-phase winding M3. No current flows through the V-phase winding M2.

At an electrical angle of 330°, a current with a magnitude $I_2$ flows from the bridge circuit R to the bridge circuit L in the U-phase winding M1, a current with a magnitude $I_2$ flows from the bridge circuit R to the bridge circuit L in the V-phase winding. M2, and a current with a magnitude Ipk flows from the bridge circuit L to the bridge circuit R in the W-phase winding M3.

Figure 5:
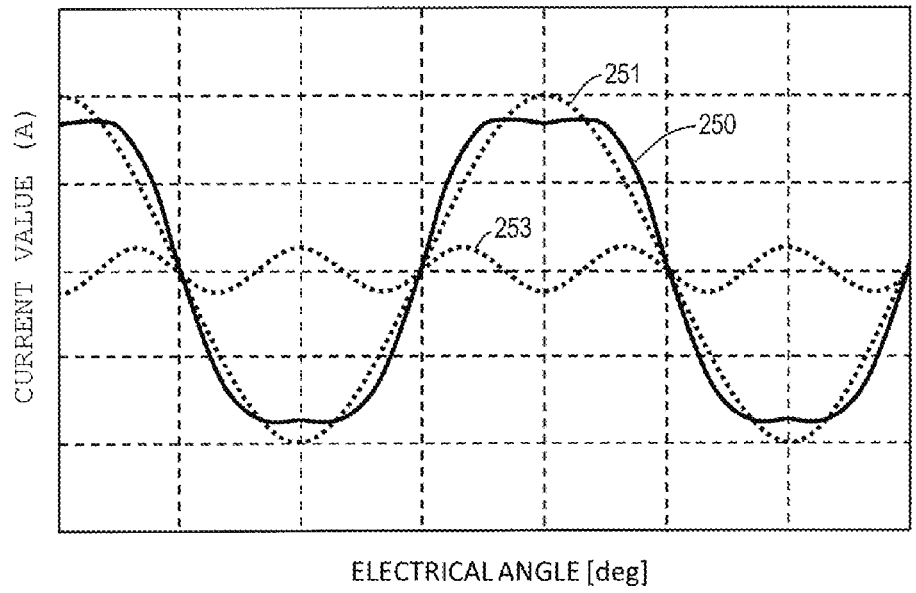
FIG. 5 is a diagram illustrating a drive current obtained by superimposing a harmonic component on a fundamental component according to an exemplary embodiment of the present invention.

In the present exemplary embodiment, the harmonic component is superimposed on the currents supplied to each of the U-phase winding M1, the V-phase winding M2, and the W-phase winding M3. FIG. 5 is a diagram illustrating a drive current obtained by superimposing the harmonic component on the fundamental component. In FIG. 5, the horizontal axis represents the motor electrical angle (deg), and the vertical axis represents the current value (A).

A harmonic component 253 has a frequency which is integer times of the frequency of a fundamental component 251 of the current. In the example shown in FIG. 5, the harmonic component 253 is a third-order harmonic component having a frequency which is three times of the frequency of the fundamental component 251. The control circuit 300 supplies a drive current 250 obtained by superimposing the harmonic component 253 on the fundamental component 251 to each of the U-phase winding M1, the V-phase winding M2, and the W-phase winding M3. The control circuit 300 controls the switching operation of each of the FETs of the bridge circuits L and R by the PWM control so that a drive current, for example, as shown in FIG. 5 can be obtained.

Next, the shape of the permanent magnet 32 for the rotor 30 which effectively reduces vibration and torque ripple will be described.

Figure 6:
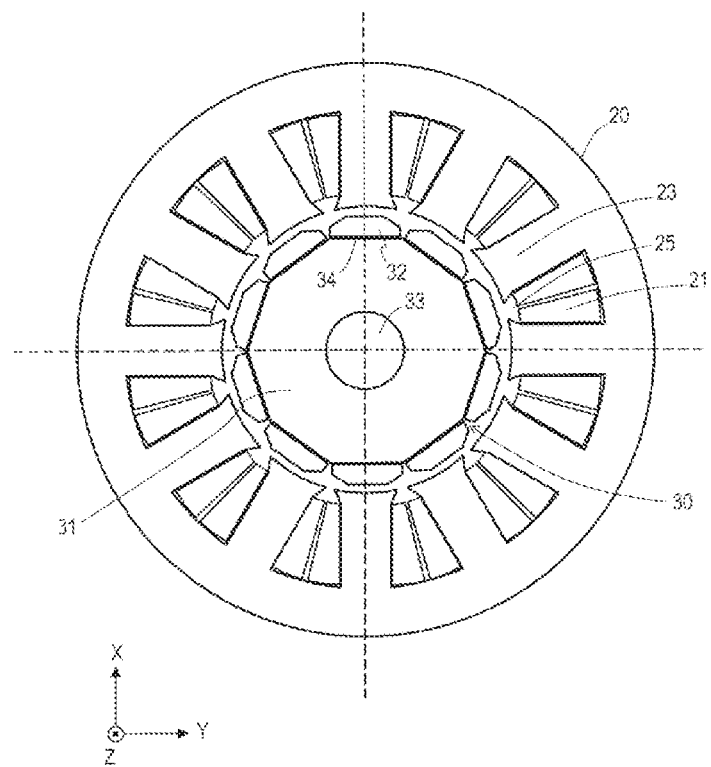
FIG. 6 is a plan view of a stator and a rotor of the motor according to an exemplary embodiment of the present invention.

FIG. 6 is a plan view illustrating an example of the stator 20 and the rotor 30 of the motor 10. In this example, the stator 20 has twelve laminated teeth 23. The rotor 30 has ten permanent magnets 32. In other words, in this example, the stator 20 has twelve grooves (slots) 25 which are formed between adjacent laminated teeth 23 and in which the windings 21 are disposed. The number of poles in the rotor 30 is 10. A structure with such a number of grooves and poles may be referred to as 12S10P (12 slots 10 pole) in some cases. In this example, the motor 10 is a three-phase motor having windings of three phases (U-phase, V-phase, W-phase). To the twelve laminated teeth 23, U-phase, V-phase, and W-phase are assigned in the order of U, U, V, V, W, W, U, U, V, V, W, and W.

The outer shape of the rotor core 31 is a polygon in the plan view when the rotor 30 is viewed from a direction parallel to the rotation axis direction of the rotor 30. In this example, the outer shape of the rotor core 31 in the plan view is a decagon. The outer peripheral portion of the rotor core 31 has a plurality of side faces 34. In this example, the outer peripheral portion of the rotor core 31 has 10 side faces 34. The ten side faces 34 are disposed adjacent to each other in the circumferential direction of the rotor core 31 and constitute the outer face of the rotor core 31. In a plan view, each side face 34 has a linear shape.

A permanent magnet 32 is disposed on each of the side faces 34. The permanent magnet 32 is fixed to the side face 34 by, for example, an adhesive or the like. Each permanent magnet 32 faces respective laminated teeth 23 in the radial direction. Note that the permanent magnet 32 may be held by the rotor core 31 using a member such as a magnet holder or may be fixed by another method.

Figure 7:
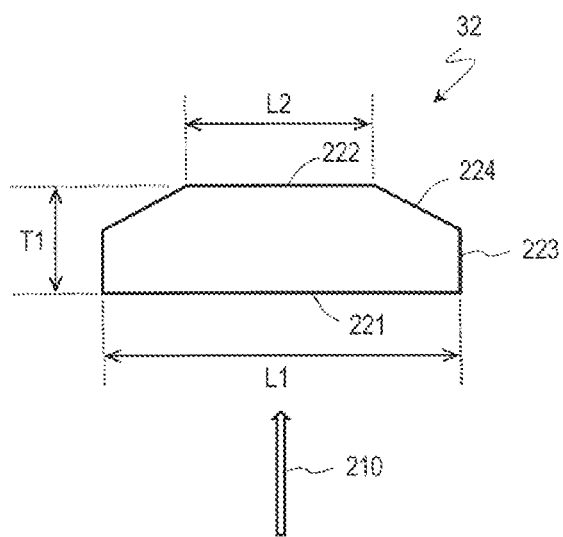
FIG. 7 is a plan view of a permanent magnet of a rotor according to an exemplary embodiment of the present invention.
Figure 8:
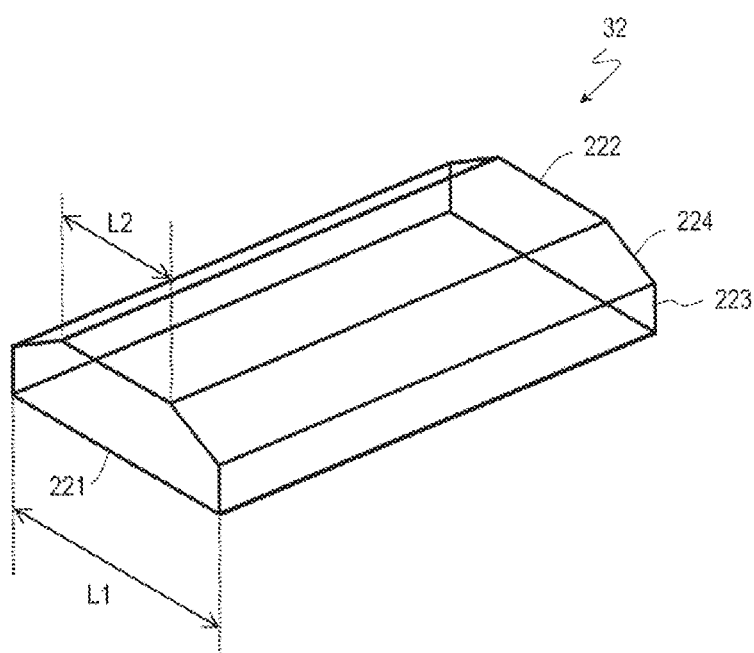
FIG. 8 is a perspective view of a permanent magnet of a rotor according to an exemplary embodiment of the present invention.

FIG. 7 is a plan view of the permanent magnet 32 of the rotor core 31. FIG. 7 illustrates the permanent magnet 32 in the plan view when the rotor 30 is viewed from a direction parallel to the rotation axis direction of the rotor 30. FIG. 8 is a perspective view of the permanent magnet 32. In FIG. 8, the interior of the permanent magnet 32 is shown transparently in order to explain the shape of the permanent magnet 32 in an easy-to-understand manner.

The permanent magnet 32 has a first face 221 contacting the side face 34 (FIG. 6) of the rotor core 31, a second face 222 located outside the first face 221 in the radial direction 210 of the rotor 30, and a side face 223 extending in the radial direction 210.

The first face 221 is the inner peripheral face of the permanent magnet 32 such that the inner peripheral face is fixed to the side face 34 of the rotor core 31. The second face 222 is the outer peripheral face of the permanent magnet 32 such that the outer peripheral face faces the laminated teeth 23 of the stator 20. The second face 222 is located opposite to the first face 221 in the radial direction.

As shown in FIG. 7, in the plan view, each of the first face 221 and the second face 222 has a linear shape. The linear portion of the first face 221 and the linear portion of the second face 222 are parallel to each other. The length L2 of the linear portion of the second face 222 is smaller than the length L1 of the linear portion of the first face 221.

In the plan view, the side face 223 of the permanent magnet 32 extends radially outward from both circumferential ends of the first face 221. The permanent magnet 32 has a connection portion 224 connecting the side face 223 and the second face 222. The connection portion 224 has a linear portion inclined with respect to the second face 222 and the side face 223.

Figure 9:
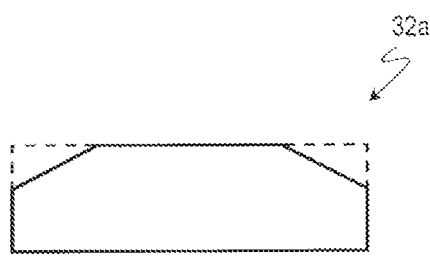
FIG. 9 is a plan view of a block-shaped magnet material according to an exemplary embodiment of the present invention.

The permanent magnet 32 for the rotor is formed, for example, by scraping a block-shaped magnet material. For the permanent magnet 32 of the present exemplary embodiment, the block-shaped magnet material is chamfered to form the permanent magnet 32 having the connection portion 224. FIG. 9 is a plan view of a block-shaped magnet material 32a. In this example, the magnet material 32a has a rectangular parallelepiped shape. By chamfering the broken line portion of the magnet material 32a shown in FIG. 9, the permanent magnet 32 having the connection portion 224 as shown in FIG. 7 is obtained.

The magnetic flux generated from the permanent magnet 32 having such a shape as shown in FIG. 7 includes a harmonic component. The magnetic flux generated from the permanent magnet 32 includes, for example, a third-order harmonic component.

Next, the drive current that the power conversion apparatus 100 supplies to the U-phase winding M1, the V-phase winding M2, and the W-phase winding M3 will be described. As described above, the power conversion apparatus 100 generates a drive current obtained by superimposing a harmonic component on the fundamental component.

The radial force Fr acting on each of the laminated teeth of the stator 20 can be expressed by the square of each interlinkage flux $\Psi$ as shown in the following equation (1). The radial force Fr is a radial excitation force acting on the laminated teeth. Here, $\mu_0$ is the magnetic permeability, N is the number of turns, and S is the area where the magnetic fluxes interlink each of the laminated teeth. The suffixes u, v, and w represent the U-phase, the V-phase, and the W-phase, respectively.

[Math. 1]

$$\begin{bmatrix} F_{ru} \\ F_{rv} \\ F_{rw} \end{bmatrix} = \frac{1}{2\mu_0 N^2 S} \begin{bmatrix} \Psi_u^2 \\ \Psi_v^2 \\ \Psi_w^2 \end{bmatrix} \quad \text{Equation 1}$$

Since the interlinkage flux $\Psi$ expressed by the sum of the magnetic flux component $\Psi m$ of the permanent magnet 32 and the current component i, it is expressed by the following equation (2), where L is the self inductance and M is the mutual inductance.

[Math. 2]

$$\begin{bmatrix} \Psi_u \\ \Psi_v \\ \Psi_w \end{bmatrix} = \begin{bmatrix} \Psi_{mu} \\ \Psi_{mv} \\ \Psi_{mw} \end{bmatrix} + \begin{bmatrix} \Psi_{iu} \\ \Psi_{iv} \\ \Psi_{iw} \end{bmatrix} = \begin{bmatrix} \Psi_{mu} \\ \Psi_{mv} \\ \Psi_{mw} \end{bmatrix} + \begin{bmatrix} L_u & M_{uv} & M_{wu} \\ M_{uv} & L_v & M_{vw} \\ M_{wu} & M_{vw} & L_w \end{bmatrix} \begin{bmatrix} i_u \\ i_v \\ i_w \end{bmatrix} \quad \text{Equation 2}$$

The control circuit 300 can control the sixth-order component (=3+3) of the radial force by using the third-order component of the magnetic flux of the permanent magnet 32 and the third-order component of the drive current. For example, the third-order component of the current is determined so that the sixth-order component of the radial force is minimized.

The motor torque Te is expressed by the following equation (3), where P is the output of the motor and $\omega$ is the angular velocity.

[Math. 3]

$$T_e = \frac{P}{\omega}\left\{\frac{1}{2}[i]^T\left(\frac{d}{dt}[L]\right)[i] + [i]^T\left(\frac{d}{dt}[\Psi_m]\right)\right\} \quad \text{Equation 3}$$

On the right side of the equation (3),

[Math. 4]

$$[i]^T\left(\frac{d}{dt}[\Psi_m]\right)$$

is the sixth-order component generated from the third-order component of the drive current and the third-order component of the magnetic flux of the permanent magnet 32. The third-order component of the current is determined so that the sixth-order component is minimized.

As a radial force, electrical angle even-order components (2nth-order components) such as a second-order component, a fourth-order component, a sixth-order component . . . are generated. In particular, the sixth-order radial force tends to cause resonance and a large magnitude of vibration in relation to the natural frequency of the motor. The vibration of the motor 10 can be reduced by determining the third-order component of the current so that the sixth-order component of the radial force is minimized.

The control circuit 300 controls the torque ripple generated from the relationship between the fundamental component of the drive current and the magnetic flux of the permanent magnet 32 based on the third-order component of the drive current and the third-order component of the magnetic flux of the permanent magnet 32. The third-order component of the current is determined so that, for example, the torque ripple generated from the relationship between the third-order component of the drive current and the magnetic flux of the permanent magnet 32 cancels the torque ripple generated from the relationship between the fundamental component of the drive current and the magnetic flux of the permanent magnet 32. The third-order component of the current is determined so that, for example, the waveform of the torque ripple generated from the relationship between the third-order component of the drive current and the magnetic flux of the permanent magnet 32 is opposite to the waveform of the torque ripple generated from the relationship between the fundamental component of the drive current and the magnetic flux of the permanent magnet 32.

Note that the fundamental component of the drive current and the third-order harmonic component do not have to be in phase with each other, or may be shifted from each other. For example, the phases of the fundamental component and the third-order harmonic component may be shifted by 120 degrees.

Figure 10:
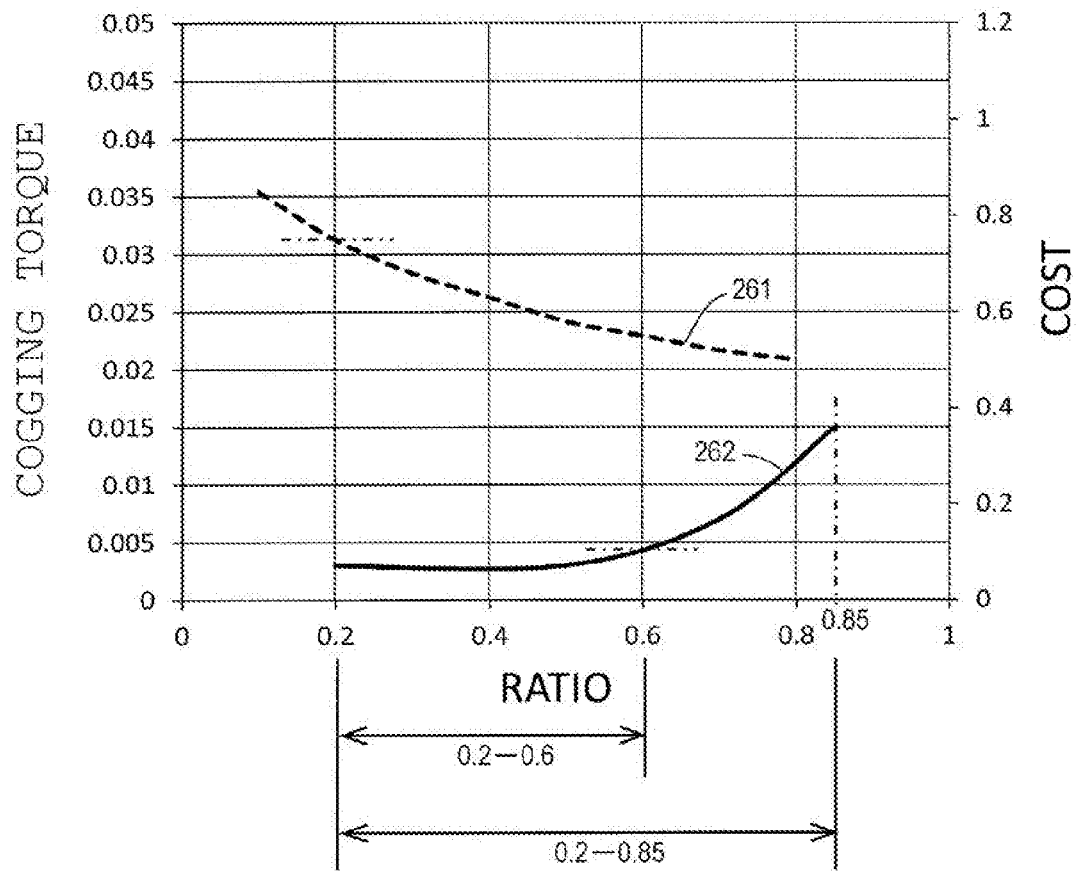
FIG. 10 is a diagram illustrating the cogging torque and the cost relative to the ratio of the length L2 to the length L1 according to an exemplary embodiment of the present invention.

Next, the relationship between the length L1 of the linear portion of the first face 221 (FIG. 7) of the permanent magnet 32 and the length L2 of the linear portion of the second face 222 will be described. FIG. 10 is a diagram illustrating a result of simulating the cogging torque and the cost relative to the ratio of the length L2 to the length L1. The horizontal axis of FIG. 10 shows the ratio, and the vertical axis shows the cogging torque and the cost. The cost means the cost for cutting a block-shaped magnet material to form the permanent magnet 32 according to the ratio. The cost of the vertical axis indicates the processing cost when the processing cost of the conventional permanent magnet is set to 1 (reference). The conventional permanent magnet has a circular arc shape as will be described later with reference to FIG. 11.

In order to effectively reduce the vibration of the motor used for the electric power steering apparatus, the cogging torque is preferably 0.015 N·m or less. Also, when the ratio is less than 0.2, the effect of reducing the processing cost is small, compared with the processing cost of the conventional permanent magnet. For example, when the ratio is less than 0.2, the processing cost is as large as about 80% or more of that of the conventional permanent magnet. Considering these factors, in the present exemplary embodiment, the ratio of the length L2 to the length L1 is 0.2 or more and less than 0.85. That is, the length L2 is 20% or more and less than 85% of the length L1. By setting the ratio to 0.2 or more and less than 0.85, a permanent magnet 32 which is low in cost and which hardly causes the vibration, the torque ripple and the like when a high-order current is superimposed on the drive current is obtained.

In order to more effectively reduce the vibration, it is preferable that the cogging torque is less than 0.005 N·m. In order to more effectively reduce the vibration, it is preferable that the ratio of the length L2 to the length L1 is 0.2 or more and less than 0.6.

Also, when the ratio of the length L2 to the length L1 is 0.5, the third-order harmonic component contained in the induced voltage of the laminated teeth is 6.5%, and the fifth-order component and the seventh-order component are almost zero. Therefore, by setting the ratio of the length L2 to the length L1 to be 0.4 or more and less than 0.6, which includes the range before and after 0.5, the torque ripple control using the third-order harmonic component of the current becomes easy, thereby further enhancing the effect of reduction in the vibration.

Figure 11:
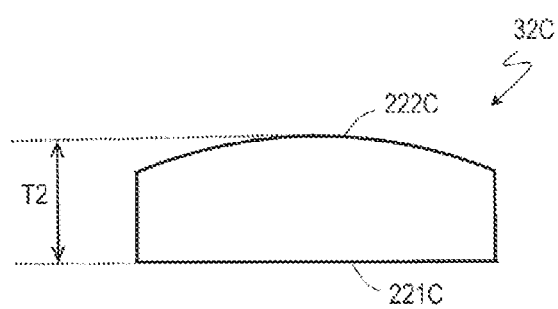
FIG. 11 is a plan view of a conventional permanent magnet.

Here, the shape of a conventional permanent magnet 32C will be described. FIG. 11 is a plan view of the conventional permanent magnet 32C. The permanent magnet 32C has a first face 221C which is a face fixed to the outer peripheral portion of the rotor core and a second face 222C facing the laminated teeth of the stator. In the plan view, for the permanent magnet 32C, the second face 222C has a curved shape, and the first face 221C and the second face 222C are not parallel to each other. The second face 222C has an arc shape. Compared with the thickness T1 (FIG. 7) of the permanent magnet 32 in this exemplary embodiment, the thickness T2 of the permanent magnet 32C shown in FIG. 10 is large. Here, the thickness of the permanent magnet is the length of the permanent magnet in the radial direction. In the plan view, the length of the first face 221 of the permanent magnet 32 is the same as the length of the first face 221C of the permanent magnet 32C. Also, the lengths of the permanent magnet 32 and the permanent magnet 32C in the axial direction of the rotor are the same.

According to the simulation result, the torque of the motor 10 including the permanent magnet 32 of the present exemplary embodiment is increased by 7%, compared with that of the motor having the conventional permanent magnet 32C. This also means that the volume of the permanent magnets required to obtain the same output can be reduced. The motor 10 including the permanent magnet 32 can suppress the cogging torque and the torque ripple to the same level, compared with the motor including the conventional permanent magnet 32C.

Further, by chamfering the block-shaped magnet material, the permanent magnet 32 can be obtained. Therefore, it is possible to facilitate the molding of the permanent magnet 32. In addition, since the polishing amount of the magnetic material can be reduced, the processing time can be shortened.

Figure 12:
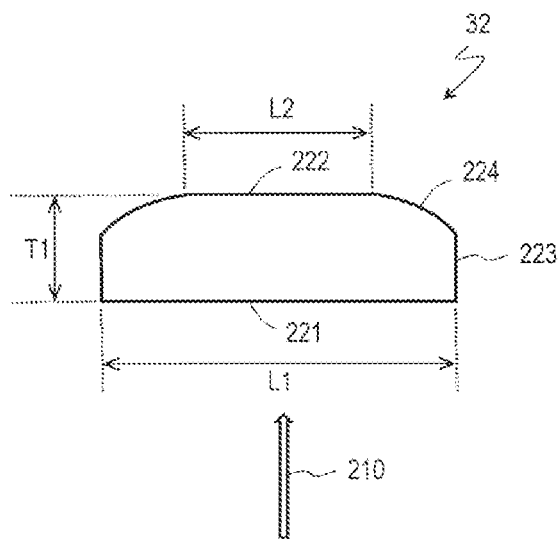
FIG. 12 is a plan view illustrating a modification of the permanent magnet of a rotor according to an exemplary embodiment of the present invention.

In the example shown in FIG. 7, the connection portion 224 of the permanent magnet 32 has a linear portion inclined with respect to the second face 222 and the side face 223. The shape of the connection portion 224 is not limited to the linear shape. FIG. 12 is a plan view showing a modification of the permanent magnet 32. In the example shown in FIG. 12, the connection portion 224 has a curved portion in the plan view. Even when the connection portion 224 has a curved portion, the same effect as described above can be obtained by satisfying the above-described ratio of the length L1 to the length L2.

Figure 13:
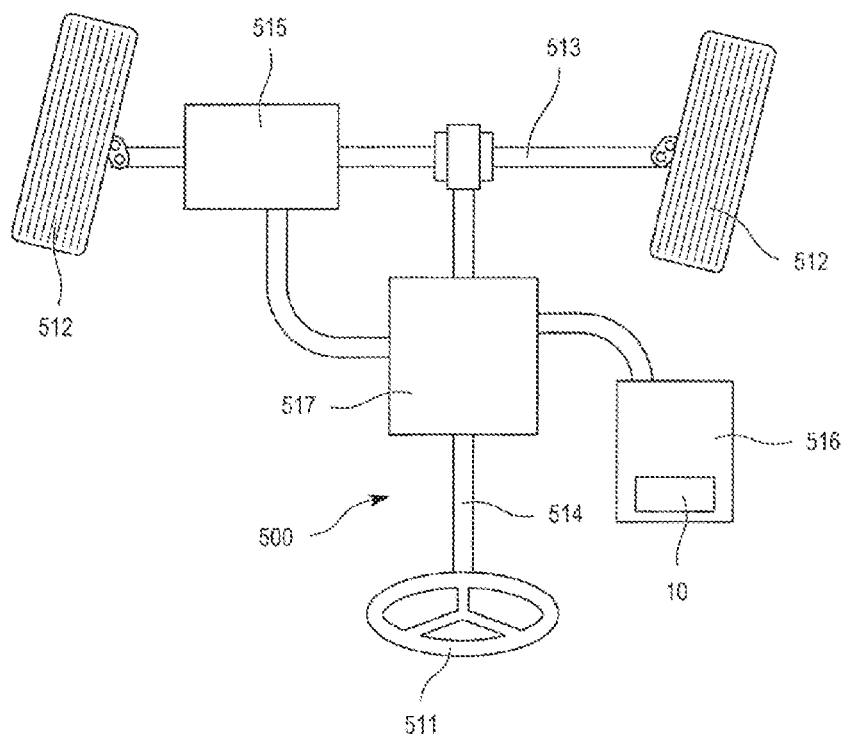
FIG. 13 is a schematic view of an electric power steering apparatus according to an exemplary embodiment of the present invention.

Next, an electric power steering apparatus mounting the motor 10 according to an exemplary embodiment will be described. FIG. 13 is a schematic view of an electric power steering apparatus 500 according to the present exemplary embodiment.

The electric power steering apparatus 500 is mounted on a steering mechanism of a wheel of an automobile. The electric power steering apparatus 500 shown in FIG. 13 reduces the steering force by hydraulic pressure. As shown in FIG. 13, the electric power steering apparatus 500 includes a motor 10, a steering shaft 514, an oil pump 516, and a control valve 517.

The steering shaft 514 transmits an input from a steering wheel 511 to an axle 513 having a wheel 512. The oil pump 516 generates a hydraulic pressure in a power cylinder 515 that transmits hydraulic driving force to the axle 513. The control valve 517 controls the movement of the oil of the oil pump 516. In the electric power steering apparatus 500, the motor 10 is mounted as a drive source of the oil pump 516.

In the example shown in FIG. 13, the assisting force generated by the motor 10 is transmitted to the axle 513 via the hydraulic pressure. The force may be transmitted to the axle 513 without using oil pressure. The electric power steering apparatus 500 may be any of a pinion assist type, a rack assist type, a column assist type, and the like.

In the electric power steering apparatus 500 including the motor 10, vibration and noise caused by the operation of the motor are reduced. Thereby, the steering feeling can be improved.

Embodiments of the present disclosure can be widely used in various devices including various motors such as a vacuum cleaner, a dryer, a ceiling fan, a washing machine, a refrigerator, and an electric power steering apparatus.

Features of the above-described exemplary embodiments and the modifications thereof may be combined appropriately as long as no conflict arises.

While exemplary embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor including a rotor core and a plurality of permanent magnets provided along an outer periphery of the rotor core;
   a stator including a plurality of windings; and
   a power conversion apparatus that supplies a current into the plurality of windings; wherein
   each of the plurality of permanent magnets includes:
      a first face in contact with an outer peripheral portion of the rotor core; and
      a second face located outside the first face in a radial direction of the rotor and facing the stator; and
   in a plan view when the rotor is viewed from a direction parallel to a rotation axis direction of the rotor:
      the first face includes a first linear portion;
      the second face includes a second linear portion parallel to the first linear portion; and
      a length of the second linear portion is 20% or more and less than 85% of a length of the first linear portion;
   the current includes a fundamental component and a harmonic component having a frequency that is an integer times of a frequency of the fundamental component;
   the harmonic component is a third-order harmonic component having a frequency which is three times of the frequency of the fundamental component; and
   based on a third-order component of a magnetic flux of the permanent magnet and a third-order component of a current supplied into the plurality of windings, the power conversion apparatus controls sixth-order component of a radial force acting on teeth of the stator.

2. The motor according to claim 1, wherein each of the plurality of permanent magnets includes:
   a side face extending in the radial direction of the rotor; and
   a connection portion that connects the second face and the side face; and
   in the plan view, the connection portion includes a third linear portion inclined with respect to the second face and the side face.

3. The motor according to claim 1, wherein each of the plurality of permanent magnets includes:
   a side face extending in the radial direction of the rotor; and
   a connection portion that connects the second face and the side face, and
   in the plan view, the connection portion includes a curved portion.

4. The motor according to claim 1, wherein
   the stator includes twelve grooves disposed between adjacent teeth and in which the plurality of windings are disposed; and
   the rotor includes 10 magnetic poles.

5. The motor according to claim 1, wherein the length of the second linear portion is 20% or more and less than 60% of the length of the first linear portion.

6. The motor according to claim 1, wherein based on the third-order component of the current supplied into the plurality of windings and the third-order component of the magnetic flux of the permanent magnet, the power conversion apparatus controls a torque ripple generated from a relationship between a fundamental component of the current supplied into the plurality of windings and the magnetic flux of the permanent magnet.

7. The motor according to claim 1, wherein
   the plurality of windings includes n-phase windings and n is an integer of 3 or more;
   the motor further includes a power conversion apparatus that supplies current into the n-phase windings; and
   the power conversion apparatus includes:
      a first inverter connected to a first end of each of the n-phase windings; and
      a second inverter connected to a second end of each of the n-phase windings.

8. An electric power steering apparatus comprising the motor according to claim 1.

* * * * *